(12) United States Patent
Nakhjavani (10) Patent No.: US 11,194,937 B2
(45) Date of Patent: Dec. 7, 2021

(54) OPTIMIZING LEVEL-SET STRUCTURAL DESIGN OF FLEXURE MECHANISM

(71) Applicant: The Boeing Company, Chicago, IL (US)

(72) Inventor: Omid B. Nakhjavani, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 637 days.

(21) Appl. No.: 16/113,903

(22) Filed: Aug. 27, 2018

(65) Prior Publication Data

US 2020/0065429 A1 Feb. 27, 2020

(51) Int. Cl.
*G06F 30/00* (2020.01)
*G06F 111/04* (2020.01)
*G06F 111/20* (2020.01)

(52) U.S. Cl.
CPC .......... *G06F 30/00* (2020.01); *G06F 2111/04* (2020.01); *G06F 2111/20* (2020.01)

(58) Field of Classification Search
CPC .. G06F 30/00; G06F 2111/04; G06F 2111/20; G06F 2119/18; G06F 30/20; Y02P 90/02
See application file for complete search history.

(56) References Cited

U.S. PATENT DOCUMENTS

2018/0055713 A1* 3/2018 Cromie .............. A63B 24/0087

OTHER PUBLICATIONS

Baradaran Nakhjavani, Omid. Developing Innovative Designs with Manufacturing Capability Using the Level Set Method. Diss. 2012.*
Nakhjavani, Developing Designs with Manufacturing Capability Using the Level Set Method, Submitted Thesis, Feb. 2011, pp. 1-98, Rice University, https://scholarship.rice.edu/bitstream/handle/1911/64616/BARADARAN-NAKHJAVANI-THESIS.pdf;sequence=1, accessed Apr. 18, 2019.

* cited by examiner

*Primary Examiner* — Saif A Alhija
(74) *Attorney, Agent, or Firm* — Kunzler Bean & Adamson (57) ABSTRACT

Disclosed herein is a method that comprises determining one or more structural constraints for a structural design of a flexure mechanism. The method also comprises optimizing a level-set formula describing the structural design of the flexure mechanism subject to the one or more structural constraints for manufacturing the structural design of the flexure mechanism. The method further comprises outputting the structural design of the flexure mechanism based on the optimized level-set formula for manufacturing.

20 Claims, 6 Drawing Sheets

OPTIMIZING LEVEL-SET STRUCTURAL DESIGN OF FLEXURE MECHANISM

FIELD

This disclosure relates generally to structural design, and more particularly to optimizing a level-set structural design of a flexure mechanism.

BACKGROUND

Determining the optimal structural design for a structure can be important when materials, cost, efficiency, and other factors are considered. Even though some design optimization methods may determine a structural design for a structure, the structural design may not be feasible to product or manufacture due to the shape, size, configuration, or the like of the structural design and/or the tools that are available to manufacture the structure.

SUMMARY

The subject matter of the present application has been developed in response to the present state of the art, and in particular, in response to the problems and disadvantages associated with conventional methods for generating structural designs of flexure mechanisms. Accordingly, the subject matter of the present application has been developed to optimize structural designs of flexure mechanisms using level-set methods that overcomes at least some of the above-discussed shortcomings of prior art techniques.

Disclosed herein is a method comprising determining one or more structural constraints for a structural design of a flexure mechanism. The method also comprises optimizing a level-set formula describing the structural design of the flexure mechanism subject to the one or more structural constraints for manufacturing the structural design of the flexure mechanism. The method further comprises outputting the structural design of the flexure mechanism based on the optimized level-set formula for manufacturing. The preceding subject matter of this paragraph characterizes example 1 of the present disclosure.

The one or more structural constraints comprises a strain energy constraint and a volume constraint. The strain energy constraint and the volume constraint are minimized. The preceding subject matter of this paragraph characterizes example 2 of the present disclosure, wherein example 2 also includes the subject matter according to example 1, above.

The strain energy constraint and the volume constraint are minimized simultaneously during optimization of the level-set formula such that the structural design has minimum volume and maximum stiffness. The preceding subject matter of this paragraph characterizes example 3 of the present disclosure, wherein example 3 also includes the subject matter according to example 2, above.

The one or more structural constraints further comprises a stress constraint. The stress constraint is maintained below a critical stress threshold while minimizing the strain energy constraint and the volume constraint. The preceding subject matter of this paragraph characterizes example 4 of the present disclosure, wherein example 4 also includes the subject matter according to any one of examples 2-3, above.

The one or more structural constraints further comprises a moment of inertia constraint. The moment of inertia constraint is maintained below a moment of inertia threshold while minimizing the strain energy constraint and the volume constraint. The preceding subject matter of this paragraph characterizes example 5 of the present disclosure, wherein example 5 also includes the subject matter according to any one of examples 2-4, above.

The one or more structural constraints further comprises a curvature constraint that comprises a convex curvature that is maintained below a curvature threshold while minimizing the strain energy constraint and the volume constraint. The preceding subject matter of this paragraph characterizes example 6 of the present disclosure, wherein example 6 also includes the subject matter according to any one of examples 2-5, above.

A boundary of the curvature constraint is defined as a function of a radius of a tool used to manufacture the structural design. The preceding subject matter of this paragraph characterizes example 7 of the present disclosure, wherein example 7 also includes the subject matter according to example 6, above.

The one or more structural constraints further comprises a manufacturability constraint. The manufacturability constraint is defined as a function of a diameter of the tool used to manufacture the structural design such that the diameter is less than a width of an opening of the structural design that the tool passes through to access a portion of the structural design while minimizing the strain energy constraint and the volume constraint. The preceding subject matter of this paragraph characterizes example 8 of the present disclosure, wherein example 8 also includes the subject matter according to example 7, above.

The structural design of the flexure mechanism is free of joints and uses one or more load points to actuate the flexure mechanism. The preceding subject matter of this paragraph characterizes example 9 of the present disclosure, wherein example 9 also includes the subject matter according to any one of examples 1-8, above.

The one or more load points are acted upon using an electrical load to actuate to the flexure mechanism. The preceding subject matter of this paragraph characterizes example 10 of the present disclosure, wherein example 10 also includes the subject matter according to example 9, above.

Also disclosed herein is an apparatus that comprises a processor and a memory. The memory stores code, executable by the processor, to determine one or more structural constraints for a structural design of a flexure mechanism, optimize a level-set formula describing the structural design of the flexure mechanism subject to the one or more structural constraints for manufacturing the structural design of the flexure mechanism, and output the structural design of the flexure mechanism based on the optimized level-set formula for manufacturing. The preceding subject matter of this paragraph characterizes example 11 of the present disclosure.

The one or more structural constraints comprises a strain energy constraint and a volume constraint. The strain energy constraint and the volume constraint are minimized. The preceding subject matter of this paragraph characterizes example 12 of the present disclosure, wherein example 12 also includes the subject matter according to example 11, above.

The strain energy constraint and the volume constraint are minimized simultaneously during optimization of the level-set formula such that the structure design has minimum volume and maximum stiffness. The preceding subject matter of this paragraph characterizes example 13 of the present disclosure, wherein example 13 also includes the subject matter according to example 12, above.

The one or more structural constraints further comprises a stress constraint. The stress constraint is maintained below a critical stress threshold while minimizing the strain energy constraint and the volume constraint. The preceding subject matter of this paragraph characterizes example 14 of the present disclosure, wherein example 14 also includes the subject matter according to any one of examples 12-13, above.

The one or more structural constraints further comprises a moment of inertia constraint. The moment of inertia constraint is maintained below a moment of inertia threshold while minimizing the strain energy constraint and the volume constraint. The preceding subject matter of this paragraph characterizes example 15 of the present disclosure, wherein example 15 also includes the subject matter according to any one of examples 12-14, above.

The one or more structural constraints further comprises a curvature constraint comprising a convex curvature that is maintained below a curvature threshold while minimizing the strain energy constraint and the volume constraint. The preceding subject matter of this paragraph characterizes example 16 of the present disclosure, wherein example 16 also includes the subject matter according to any one of examples 12-15, above.

A boundary of the curvature constraint is defined as a function of a radius of a tool used to manufacture the structural design. The preceding subject matter of this paragraph characterizes example 17 of the present disclosure, wherein example 17 also includes the subject matter according to example 16, above.

The one or more structural constraints further comprises a manufacturability constraint defined as a function of a diameter of the tool used to manufacture the structural design such that the diameter is less than a width of an opening of the structural design that the tool passes through to access a portion of the structural design while minimizing the strain energy constraint and the volume constraint. The preceding subject matter of this paragraph characterizes example 18 of the present disclosure, wherein example 18 also includes the subject matter according to example 17, above.

The structural design of the flexure mechanism is free of joints and uses one or more load points to actuate the flexure mechanism. The preceding subject matter of this paragraph characterizes example 19 of the present disclosure, wherein example 19 also includes the subject matter according to any one of examples 11-18, above.

Further disclosed herein is a program product comprising a computer readable storage medium that stores code executable by a processor. The executable code comprises code to determine one or more structural constraints for a structural design of a flexure mechanism, optimize a level-set formula describing the structural design of the flexure mechanism subject to the one or more structural constraints for manufacturing the structural design of the flexure mechanism, and output the structural design of the flexure mechanism based on the optimized level-set formula for manufacturing. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
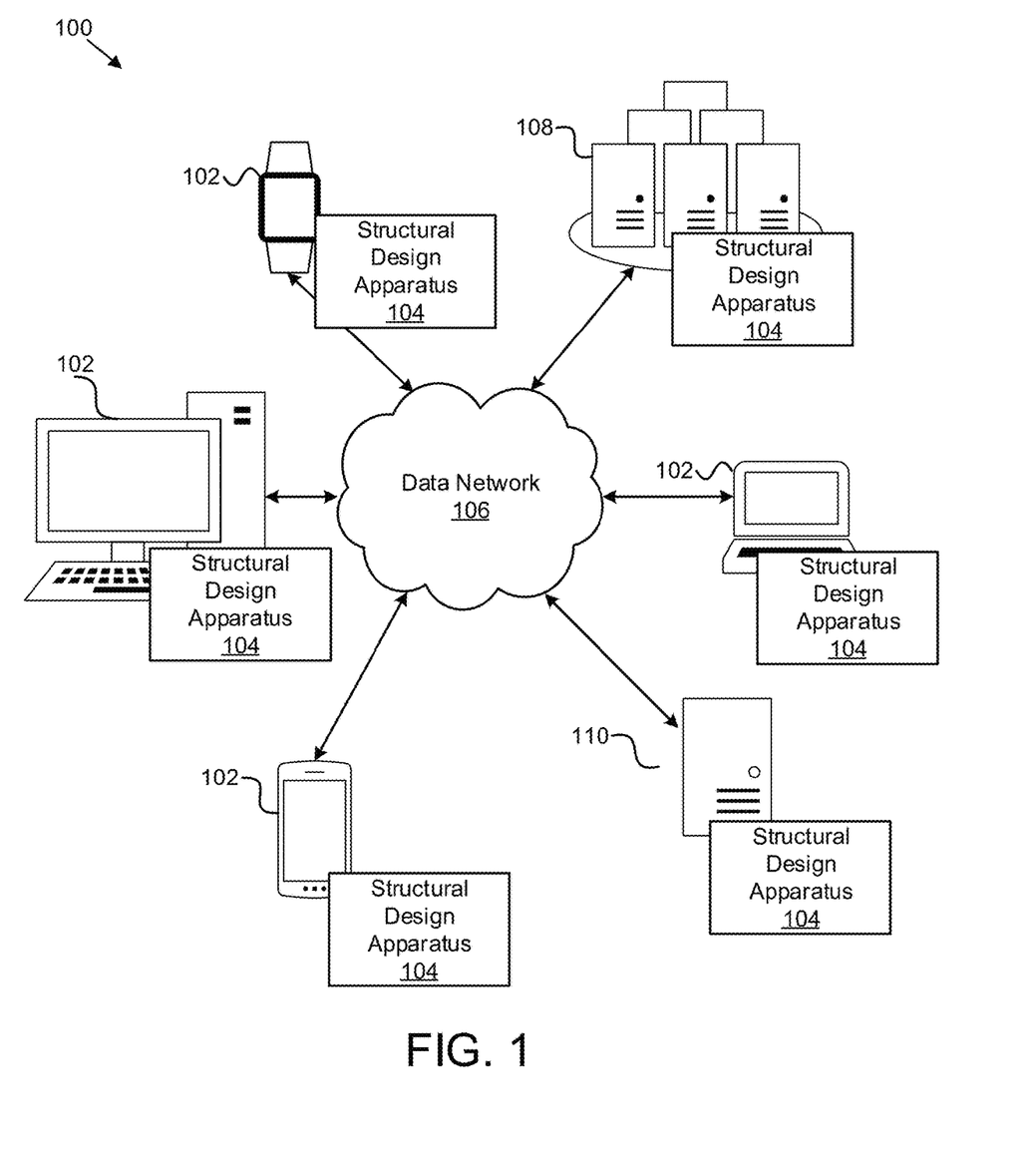
FIG. 1 is a schematic block diagram of a system for optimizing the level-set structural design of a flexure mechanism, according to one or more examples of the present disclosure.

FIG. 1 is a schematic block diagram illustrating one embodiment of a system 100 for optimizing the level-set structural design of a flexure mechanism. The system 100 includes one or more information handling devices 102, one or more structural design apparatuses 104, one or more data networks 106, and one or more servers 108. Even though a specific number of information handling devices 102, structural design apparatuses 104, data networks 106, and one or more servers 108 are depicted in FIG. 1, one of skill in the art will recognize, in light of this disclosure, that any number of information handling devices 102, structural design apparatuses 104, data networks 106, and one or more servers 108 may be included in the system 100.

The information handling devices 102 of the system 100 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or, one or more servers 108 over the data network 106, described below. The information handling devices 102 may include processors, processor cores, and/or the like that are configured to execute various programs, program code, applications, instructions, functions, and/or the like for analyzing, processing, imaging, and/or the like structural designs for flexure mechanisms.

In one embodiment, the structural design apparatus 104 is configured to determine one or more structural constraints for a structural design of a flexure mechanism. As used herein, a flexure mechanism may be a device that includes a series of rigid bodies connected by compliant elements that produce a geometrically well-defined motion on application of a force. A flexure mechanism, in certain embodiments, receives an input energy, e.g., an electrical load, to deform or alter elastic members of the flexure mechanism to generate an output motion. Thus, in one embodiment, the flexure mechanism does not include joints or similar mechanisms for generating movement, but is instead manufactured to be rigid and flexible enough to generate movement in response to an input energy.

The structural design apparatus 104, in certain embodiments, is configured to optimize a level-set formula that describes the structural design of the flexure mechanism subject to the one or more structural constraints for manufacturing the structural design of the flexure mechanism. A level-set formula, as used herein, may include a conceptual framework for using level sets as a tool for numerical analysis of surfaces and shapes. In certain embodiments, level-set methods may be based on a numerical method to simulate dynamic implicit surface changes. In other words, the structural design apparatus 104 may employ topographical optimization to optimize material layout within a given design space, for a given set of loads, boundary conditions and constraints with the goal of maximizing the performance of the system. In certain embodiments, the structural design apparatus 104 is configured to present the structural design of the flexure mechanism based on the optimized level-set formula for manufacturing.

In one embodiment, the structural design apparatus 104 provides a solution to drawbacks in conventional systems for designing flexure mechanisms. In conventional flexure mechanism design, the structure of the flexure mechanism may be generated, but the resulting structural design may not be feasible to manufacture or use due to tooling constraints, practicality issues, and/or the like. The structural design apparatus 104, on the other hand, generates optimized structural designs for flexure mechanisms using level-set methods while considering various constraints on manufacturability of the structural design.

In various embodiments, the structural design apparatus 104 may be embodied as a hardware appliance that can be installed or deployed on an information handling device 102, on a server 108, or elsewhere on the data network 106. In certain embodiments, the structural design apparatus 104 may include a hardware device such as a secure hardware dongle or other hardware appliance device (e.g., a set-top box, a network appliance, or the like) that attaches to a device, a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the structural design apparatus 104 may include a power interface, a wired and/or wireless network interface, a graphical interface that attaches to a display, and/or a semiconductor integrated circuit device as described below, configured to perform the functions described herein with regard to the structural design apparatus 104.

The structural design apparatus 104 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the structural design apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the structural design apparatus 104.

The semiconductor integrated circuit device or other hardware appliance of the structural design apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the structural design apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, file transfer protocol ("FTP") servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

Figure 2:
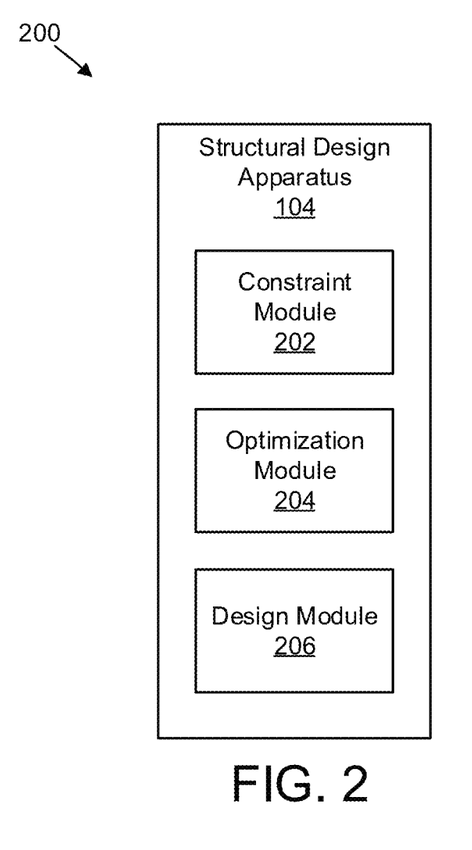
FIG. 2 is a schematic block diagram of an apparatus for optimizing the level-set structural design of a flexure mechanism, according to one or more examples of the present disclosure.

FIG. 2 depicts one embodiment of an apparatus 200 for optimizing level-set structural design of flexure mechanism. The apparatus 200 includes an embodiment of the structural design apparatus 104. The structural design apparatus 104, in certain implementations, includes one or more of a constraint module 202, an optimization module 204, and a design module 206, which are described in more detail below.

The constraint module 202, in certain embodiments, is configured to determine one or more structural constraints for a structural design of a flexure mechanism. In one embodiment, a structural constraint may include a strain energy constraint. For instance, the desired outcome of the design optimization, e.g., the topology optimization, may be to increase the stiffness of a flexure mechanism by increasing the volume of the structure so that the flexure mechanism can withstand various forces; however, increasing the volume of the flexure mechanism can cause an increase in the amount of material that is used to manufacture the flexure mechanism, which may not be desirable.

Therefore, in certain embodiments, the flexibility and/or volume is minimized simultaneously using an objective function. Increasing the flexibility, in some embodiments, can increase the strain energy of a flexure mechanism, and so the flexibility may be used as a constraint in the objective function. Therefore, the strain energy and volume may be defined as initial constraints for the topology optimization of the flexure mechanism such that the strain energy $S_e$ is minimized such that the volume V is less than a threshold volume $V^*$.

In one embodiment, by imposing the initial constraints above, the optimal structural design may be achieved with a minimum volume and maximum stiffness. In production, however, there may be limitations such as tool size, diameter, yielding stress, etc., that can affect the manufacturability and production of the structural design of the flexure mechanism. In addition to the initial constraints, other structural constraints may be considered.

For instance, in one embodiment, a structural constraint may include a stress constraint. The materials used in a flexure structure may have a yielding stress such that applying stress that exceeds the yielding stress to the flexure structure may cause the flexure structure to fail or may otherwise damage the flexure structure. In other words, the initial constraints (e.g., minimizing the strain energy $S_e$ such that the volume V is less than a threshold volume $V^*$) cause a decrease in the volume of the flexure mechanism, which consequently decreases the yielding stress of the flexure mechanism. In one embodiment, the optimal structural design is achieved by keeping the initial constraints the same for all materials. Therefore, to ensure the similarity of results, a stress constraint is included along with the initial constraints such that the strain energy $S_e$ is minimized such that the volume V is less than a threshold volume $V^*$ subject to the stress constraint S being less than a critical stress threshold $S^*$.

In one embodiment, a structural constraint may include a moment of inertia constraint. In such an embodiment, when rotational or other movement is applied to the flexure mechanism, the inertia of the flexure mechanism increases. In order to optimize the structural design of the flexure mechanism, the moment of inertia is prevented from exceeding a moment of inertia threshold, which may also conserve energy. Thus, the moment of inertia constraint may be included along with the other constraints such that the strain energy $S_e$ is minimized such that the volume V is less than a threshold volume V* subject to the stress constraint S being less than a critical stress threshold S* and the moment of inertia I constraint being less than a moment of inertia threshold I*.

In further embodiments, a structural constraint may include a curvature constraint, which relates to manufacturability of the flexure mechanism. In certain embodiments, the limitation for the curvature constraint is the radii of the tools that are used to manufacture the flexure mechanism. In other words, if the structural design of the flexure mechanism requires that cuts be made that are smaller than the radii of the tools being used, then the flexure mechanism cannot be manufactured with the available tools. During manufacturing, convex curvature may not cause manufacturing limitations, thus the convex curvature may be a sufficient constraint for the structural design. Thus, the curvature constraint may be included along with the other constraints such that the strain energy $S_e$ is minimized such that the volume V is less than a threshold volume V* subject to the stress constraint S being less than a critical stress threshold S*, the moment of inertia I constraint being less than a moment of inertia threshold I*, and if the radii r required to manufacture the structural design is greater than 0, then ensuring that r is greater than the radii r* of the available tools.

In one embodiment, a structural constraint may include a manufacturability constraint. While the curvature constraint may ensure that each point of the structure can satisfy a constant radius, e.g., the radius of the available tool(s), there is no guarantee that the curvature constraint will generate a structure that will work for every tool. For instance, the curvature constraint ensures that each local curvature meets the given criteria (e.g., tool radius), but there still may be issues with the combination of curvatures and their placement in the structural design. For example, although a local curvature constraint for a structural design is satisfied, a tool with radius r* may not be able to pass through or access a part of the structural design where tooling is required because the access point has a diameter that is less than the diameter of the tool.

As a result, manufacturing the structure based on the structural design using the particular tool is not possible. The manufacturing constraint, therefore, ensures that the distance or width between the two points defining the opening of the access point of the structural design is greater than the tool's diameter, which allows the tool to move and have access to all the points. Thus, the manufacturing constraint may be included along with the other constraints such that the strain energy $S_e$ is minimized such that the volume V is less than a threshold volume V* subject to the stress constraint S being less than a critical stress threshold S*, the moment of inertia I constraint being less than a moment of inertia threshold I*, if the radii r required to manufacture the structural design is greater than 0, then ensuring that r is greater than the radii r* of the available tools, and ensuring that the distance between two points defining an access point d is greater than the diameter d* (also calculated as 2r*) of the tool.

The constraint module 202, in certain embodiments, may select one or more of the foregoing constraints for use in level-set optimization of the structural design. The constraint module 202 may select the constraints based on the type of flexure mechanism being developed, the size/weight/volume of the flexure mechanism, the application of the flexure mechanism, and/or the like. The constraint module 202 may select the constraints based on user input, e.g., from a designer or manufacturer making the flexure mechanism.

In one embodiment, the constraint module 202 recommends one or constraints, threshold values, and/or other parameters for use in the level-set optimization of the structural design of the flexure mechanism over time after a plurality of iterations fort optimizing the level-set formula are performed. For instance, the constraint module 202 may incorporate one or more of the foregoing constraints into the level-set formula with default values/parameters and may perform multiple iterations while changing the values/parameters, changing/adding/removing different constraints, and/or the like until the level-set formula is optimized for the structural design of the flexure mechanism. The constraint module 202 may stop processing different iterations when all of the various different combination has been attempted, when goal values for the constraints are achieved, and/or the like. In certain embodiments, the constraint module 202 may receive various values, settings, constraints, parameters, weights, iteration limits, and/or the like for the level-set formula and the constraints from a user, from a file, from the internet, and/or from other input sources.

In one embodiment, the optimization module 204 is configured to optimize a level-set formula that describes or generates the structural design of the flexure mechanism subject to the one or more constraints described above. The level-set formula may be defined with the Hamilton-Jacobi equation:

$$\phi_t + V_n |\nabla \phi| = 0$$

The relationship between the level-set formula and the structural shape optimization (topology optimization) is the surface changes with respect to time, defined as the velocity, $V_n$. The desired outcome in structural optimization is minimizing the cost function:

$$C(\phi) = \int_\Omega \frac{1}{2} E(\phi) \cdot \varepsilon^T \cdot D \cdot \varepsilon \cdot d\Omega$$

where $\Omega$ is the design space, $\varepsilon$ is the strain tensor, D is the stiffness matrix, and $E(\Phi)$ is the Young module, which is defined as:

$$E(\phi) = E_0 \cdot H(\phi) + (1 - H(\phi)) \cdot E_{min}$$

subject to the constraint:

$$\int H(\phi) \cdot d\Omega \leq V^*$$

where the volume V is less than a threshold volume V*. Given the Lagrange equation:

$$J(\varepsilon, \phi, \lambda) = \int_\Omega \left[ \frac{1}{2} E(\phi) \cdot \varepsilon^T \cdot D \cdot \varepsilon + \lambda (H(\phi) - V^*/V^\Omega) \right] \cdot d\Omega$$

which, when minimized is:

$$\delta_\phi J = 0 \rightarrow [\tfrac{1}{2}(E_0 - E_{min}) \cdot \varepsilon^T \cdot D \cdot \varepsilon + \lambda] \cdot \delta(\phi) \cdot |\nabla \phi| = 0$$

and substituting for the Hamilton-Jacobi equation is:

$$\frac{\partial \phi}{\partial t} - \left[ \frac{1}{2}(E_0 - E_{min}) \cdot \varepsilon^T \cdot D \cdot \varepsilon + \lambda \right] \cdot \delta(\phi) \cdot |\nabla \phi| = 0$$

Finally, based on the foregoing, solving for the level-set formula gives:

$$\frac{\partial \phi}{\partial t} - \left[\frac{1}{2}(E_0 - E_{min}) \cdot \varepsilon^T \cdot D \cdot \varepsilon + \lambda\right] \cdot \delta(\phi) \cdot |\nabla \phi| = 0$$

$$E(\phi) = E_0 \cdot H(\phi) + (1 - H(\phi)) \cdot E_{min}$$

$$\lambda = -\frac{\int_\Omega \left[\frac{1}{2}(E_0 - E_{min}) \cdot \varepsilon^T \cdot D \cdot \varepsilon\right] \delta^2(\phi) \cdot |\nabla \phi| \cdot d\Omega}{\int_\Omega \delta^2(\phi) \cdot |\nabla \phi| \cdot d\Omega}$$

Thus, in one embodiment, the level-set method may be used to determine the shape of the flexure mechanism using an objective function:

$$-GA = -\frac{\Delta_{out}}{\Delta_{in}}$$

subject to the constraint:

$$\int H(\phi) \cdot d\Omega < V^*$$

Maxwell's reciprocity principle is then used to regenerate the equations:

$$\Delta_{in} = \frac{-F_{in} \cdot u_{1i} - f_0 \cdot u_{2i} - F_{in} \cdot k \cdot u_{1o} \cdot u_{2i} + F_{in} \cdot k \cdot u_{1i} \cdot u_{2o}}{-1 + k \cdot u_{2o}}$$

$$\Delta_{out} = \frac{-F_{in} \cdot u_{1o} - f_0 \cdot u_{2o}}{-1 + k \cdot u_{2o}}$$

Finally, if the design space is $V^\Omega$ and $\lambda$ is the Lagrange factor, then:

$$J(\phi) = \frac{F_{in} \cdot u_{1o} + f_0 \cdot u_{2o}}{-F_{in} \cdot u_{1i} - f_0 \cdot u_{2i} - F_{in} \cdot k \cdot u_{1o} \cdot u_{2i} + F_{in} \cdot k \cdot u_{1i} \cdot u_{2o}} +$$

$$\lambda \int_\Omega (H(\phi) - V^*/V^\Omega) d\Omega$$

$$D_\Omega J = \frac{\partial J}{\partial u_{1i}} D_\Omega u_{1i} + \frac{\partial J}{\partial u_{1o}} D_\Omega u_{1o} + \frac{\partial J}{\partial u_{2i}} D_\Omega u_{2i} +$$

$$\frac{\partial J}{\partial u_{2o}} D_\Omega u_{2o} + \lambda \cdot D_\Omega \left(\int_\Omega (H(\phi) - V^*/V^\Omega) d\Omega\right)$$

After substituting the displacement into the equation, and using the Dirac and Heaviside functions and Euler-Lagrange, then:

$$G = \left[\frac{\partial J}{\partial u_{1i}} E_{ijkl} \cdot \varepsilon_{ij}(u_1) \cdot \varepsilon_{kl}(u_1) + \left(\frac{\partial J}{\partial u_{1o}} + \frac{\partial J}{\partial u_{2i}}\right) E_{ijkl} \cdot \varepsilon_{ij}(u_1) \cdot \varepsilon_{kl}(u_2) + \right.$$

$$\left. \frac{\partial J}{\partial u_{2o}} E_{ijkl} \cdot \varepsilon_{ij}(u_2) \cdot \varepsilon_{kl}(u_2) + \lambda\right] \cdot \delta(\phi) \cdot |\nabla \phi| = 0$$

The level-set function is then derived as:

$$\frac{\partial \phi}{\partial t} - G(\phi) = 0$$

$$\lambda = -\frac{\int_\Omega G \cdot \delta \cdot (\phi) \cdot |\nabla \phi| \cdot d\Omega}{\int_\Omega \delta^2(\phi) \cdot |\nabla \phi| \cdot d\Omega}$$

Implementation of the stress constraint in the level-set formula may include calculating the stress at each point of the structural design, and then modifying the surface equation. The surface equation may use boundary points; however, the large stresses do not happen at the boundaries, and therefore the integral of all stresses that are larger than the yielding/critical stress are used instead of the stress at each point. Thus, the level-set equation subject to the stress constraint becomes:

$$\frac{\partial \phi}{\partial t} - \left[\frac{1}{2}(E_0 - E_{min}) \cdot \varepsilon^T \cdot D \cdot \varepsilon + \lambda + \beta_1 \cdot \text{stress}\right] \cdot \delta(\phi) \cdot |\nabla \phi| = 0$$

In the above equation, the $\beta_1$ may be calculated by trial and error, which should the importance of this constraint compared to the other constraints. In one embodiment, this parameter $\beta_1$ defines the meshing size and the accuracy of the calculation (more accuracy may require more time, and there is a possibility that the calculation may not converge to a solution; larger numbers may make the meshing size for a finite element method larger, and release some calculation time and other constraint boundaries).

Furthermore, in another embodiment, for the moment of inertia constraint, the integral of inertia is used; however, the points that are included in the structure can be used to calculate the integral because the value of the surface is positive. The moment of inertia may be calculated as follows:

$$\text{Inertia} = \{\int r^2 \cdot (\rho_1 + \rho_2 \cdot (\phi > 0))\} - I^*$$

In the equation above, I* is the permissible inertia, and $\rho_1$ and $\rho_2$ are the density of the flexure mechanism being designed. Thus, the level-set equation subject to the moment of inertia constraint is as follows:

$$\frac{\partial \phi}{\partial t} - \left[\frac{1}{2}(E_0 - E_{min}) \cdot \varepsilon^T \cdot D \cdot \varepsilon + \lambda + \beta_2 \cdot \text{Intertia}\right] \cdot \delta(\phi) \cdot |\nabla \phi| = 0$$

In the above equation, the $\beta_2$ may be calculated by trial and error.

Regarding the curvature constraint, the definition of curvature with respect to the normal vector may be expressed as follows:

$$k = \nabla \cdot \vec{N} = \nabla \cdot \left(\frac{\nabla \phi}{|\nabla \phi|}\right)$$

$$k = \frac{(\phi_x^2 + \phi_y^2)^{3/2}}{(\phi_x^2 * \phi_{yy} - 2\phi_x \cdot \phi_y \cdot \phi_{xy} + \phi_y^* * \phi_{xx})}$$

Therefore, for k>0, the region is concave, for k<0, the region is convex, and for k=0, the region is flat. As explained above, modification of the curvature for manufacturability constraints may be used for concave curvatures. It may be desirable to create a surface that is smooth without any curvature. To do so, the points where k>0 and that have a lower tool radius r* are expanded. By doing this, not only does k increase, but the surfaces are smoother.

In certain embodiments, the curvature constraint only effects the manufacturability of the flexure mechanism, and not the overall optimal shape, size, design of the flexure mechanism. In order to achieve this purpose, while also decreasing the process time, a time-dependent coefficient may be used. In other words, as the time increases (e.g., the time to derive the optimal structural design subject to the curvature constraint), the effect of the curvature constraint on the structural design of the flexure mechanism also increases. Accordingly, the level-set equation becomes:

$$\frac{\partial \phi}{\partial t} - \left[\frac{1}{2}(E_0 - E_{min}) \cdot \varepsilon^T \cdot D \cdot \varepsilon + \lambda + t \cdot k_0\right] \cdot \delta(\phi) \cdot |\nabla \phi| = 0$$

In some embodiments, the curvature constraint cannot guarantee the manufacturability of the flexure mechanism due to limitations in the size of the tools used and the size of the access points/openings within the structural design that are used to access portions of the flexure mechanism with the tools for manufacturing. The manufacturing constraint may therefore be calculated as a function of the vertical distance/width between boundary points that define an access point/opening for a tool to access the flexure mechanism.

In one embodiment, the manufacturing constraint is determined by:
1. Assume a point H and a tool with diameter d.
2. Calculate the vertical direction from point H.
3. Transfer the axial coordinate to point H, where the y-axis is vertical, and the x-axis is tangential to the surface.
4. Find the number of points on the surface that have a positive value (material) and are in the range of –d<y<0 and –e<x<e. The greater the number of these points, the more achievable the manufacturing constraints. In other words, with a greater number of these points, it can be shown that the distances between the points are less than the d diameter necessary for the manufacturing constraint.

Figure 3:
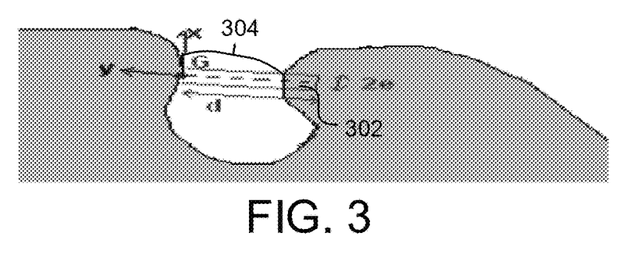
FIG. 3 illustrates an example of a structural design limitation for manufacturing.

As shown in FIG. 3, a rectangle 302 is generated with the lengths d and 2e, which are assumed for the manufacturing constraint. With respect to the value of the positive points, as depicted in FIG. 3, the manufacturing constraint is not satisfied because the tools cannot pass through the opening 304 to access this particular portion of the structural design for manufacturing. Thus, the level-set equation is modified subject to the manufacturing constraint as follows:

$$\frac{\partial \phi}{\partial t} - \left[\frac{1}{2}(E_0 - E_{min}) \cdot \varepsilon^T \cdot D \cdot \varepsilon + \lambda - t \cdot \beta_4 \cdot st\right] \cdot \delta(\phi) \cdot |\nabla \phi| = 0$$

In the foregoing equation, st is the number of points from the last iteration.

The design module 206, in one embodiment, outputs or presents the structural design of the flexure mechanism based on the optimized level-set formula. The design module 206, for instance, may output or present the generated structural design in one or more formats that can be used for manufacturing, such as computer-aided design formats, or the like. The design module 206, in some embodiments, may send an email, text, or other notification of the structural design, store the structural design in a cloud repository, send the structural design to one or more manufacturing devices and applications, and/or the like.

FIGS. 4A-4E depict one embodiment of an example structural design based on optimizing level-set structural design. The subject matter described herein may be used to generate structural designs for various different flexure mechanisms and other structures that have applicability in different industries. The embodiments depicted in FIGS. 4A-4E, for example, may be for a support structure 406 for solar panels, e.g., such as for a satellite or other structure used in space. Designing solar arrays and solar panel supports may be challenging due to the extreme environment in space, weight and size limitations, and so on. For instance, the solar array, including the solar panel supports need to be large enough to generate power for space structures such as satellites, space stations, or the like. Because a solar array requires support structures for its solar panels, optimizing the structural design of the support structures using the optimized level-set method described herein may generate support structures that are structurally strong, robust, and lighter than conventional support structures while also being manufacturable.

Figure 4A:
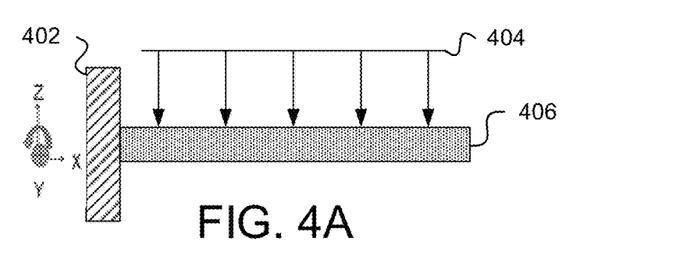
FIGS. 4A-4E depict one embodiment of an example structural design based on optimizing level-set structural design.

The support structure includes a cantilever beam 402 coupled to a support structure 406 that supports the solar panels, which generate forces 404 against the support structure 406, as depicted in FIG. 4A. One of the issues with this application is accounting for the imposing forces 404 with respect to the moment of inertia. Thus, it may be important to recognize that the optimal structural design for the support structure 406 will be used as a support for solar panels, which distribute the force 404 throughout the support structure 406. In other words, the forces 404, which include the weight of the support structure 406, exist at all points of the support structure 406. The forces for the support structure 406 and the solar panels may be calculated with respect to the density:

$$F = r \cdot \omega^2 \cdot (\alpha_1 + \alpha_2 \cdot (\phi > 0))$$

Figure 4B:
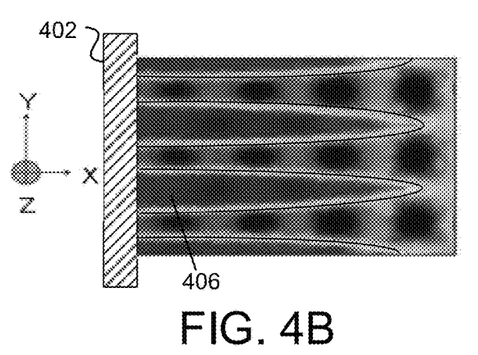

FIG. 4B illustrates a top view of the results of the optimized level-set structural design for the support structure 406, starting from an initial, zero-set surface that has continuous distributed mass in area, length, and width with some discontinuity in lateral direction. FIG. 4B depicts the optimized structural design without applying any of the constraints described above. Considering the imposed lateral force 404 on the structure, the resultant structural design may be expected. Moreover, part of the result of imposing the force 404 on the support structure 406 depends on the mass distribution. Therefore, it may be expected that the forces and strain energy decrease further from the moment axis.

Figure 4C:
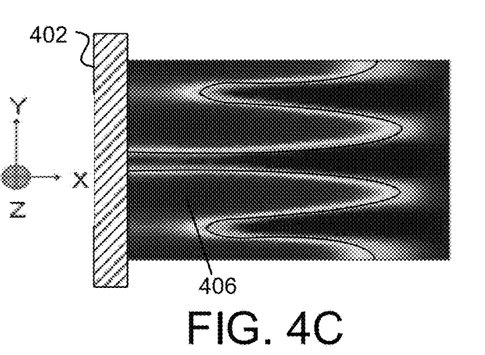
Figure 4D:
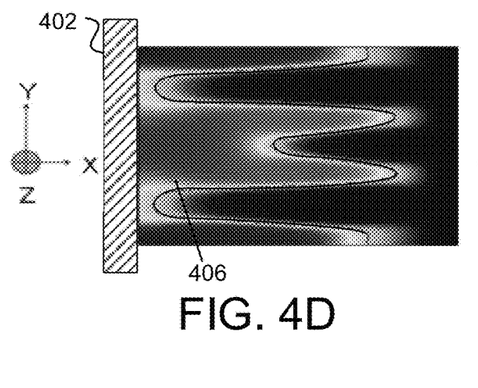
Figure 4E:
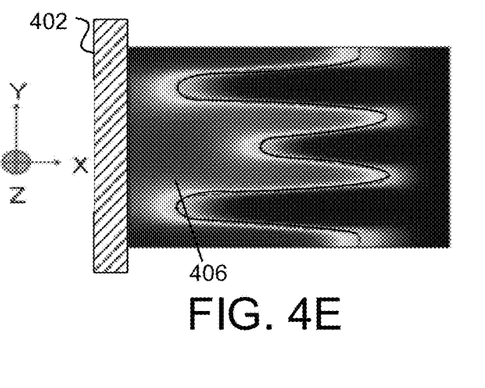

FIG. 4C depicts a top view of the results of the optimized level-set structural design for the support structure after imposing the moment of inertia constraint, as described above. As illustrated in FIG. 4C, the sharp edges and the points with lower curvature have disappeared from FIG. 4B. FIG. 4D depicts a top view of the results of the optimized level-set structural design for the support structure after imposing the moment of inertia and the curvature constraints, which further refines the structural design of the support structure. Further, FIG. 4E depicts a top view of the results of the optimized level-set structural design for the support structure after imposing the moment of inertia, the curvature, and the manufacturability constraints, which further refines the structural design of the support structure so that it meets the structural needs to support the solar panels, while also being manufacturable.

Figure 5A:
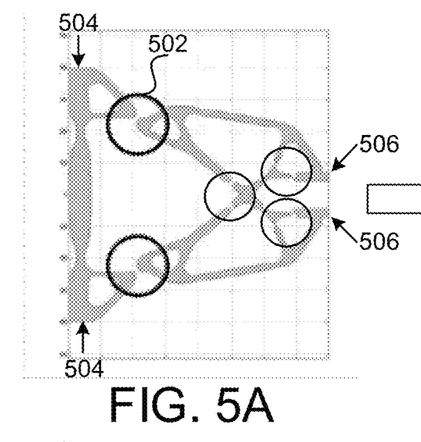
FIGS. 5A-5F depict various flexure mechanisms that may be generated using the optimized level-set structural design methods described here.
Figure 5B:
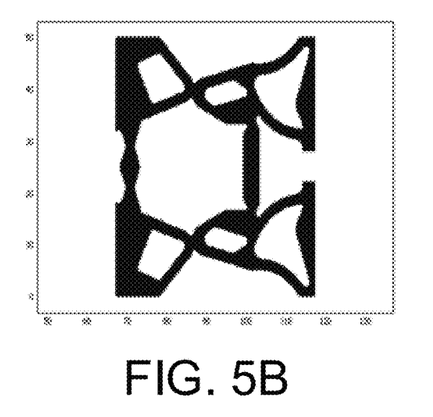

FIGS. 5A-5F depict output of various flexure mechanisms that may be generated using the optimized level-set structural design methods described here. FIG. 5A depicts an optimized level-set structural design of a gripper flexure mechanism that is actuated by applying loads 504 or forces, e.g., electrical loads at points on the end of the gripper to cause the grippers 506 to move towards each other. As is evident in FIG. 5A, even though this is the optimal level-set structural design for the gripper, there are obvious manufacturing issues 502 in the design such as holes, weak joints, portions to cut out that are smaller than the available tools, and/or the like. FIG. 5B, on the other hand, depicts the resultant structural design when the constraints described above are accounted for in the level-set formula. The resulting structural design is now manufacturable based on the given constraints, while providing optimal flexibility and volume.

Figure 5C:
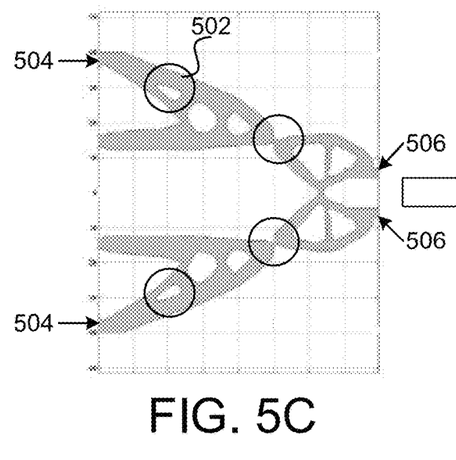
Figure 5D:
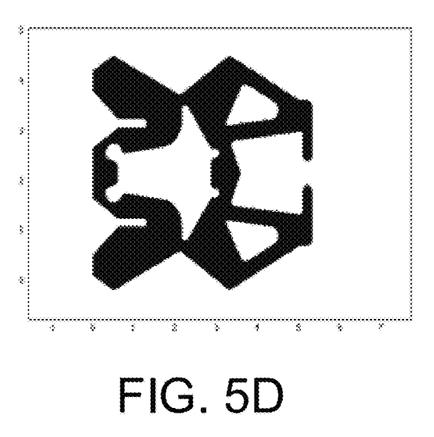

Similarly, FIG. 5C depicts an optimized level-set structural design of a gripper flexure mechanism that is actuated by applying loads 504 or forces, e.g., electrical loads at points on the end of the gripper to cause the grippers 506 to move towards each other. As is evident in FIG. 5C, even though this is the optimal level-set structural design for the gripper, there are obvious manufacturing issues 502 in the design such as holes, weak joints, portions to cut out that are smaller than the available tools, and/or the like. FIG. 5D, on the other hand, depicts the resultant structural design when the constraints described above are accounted for in the level-set formula. The resulting structural design is now manufacturable based on the given constraints, while providing optimal flexibility and volume.

Figure 5E:
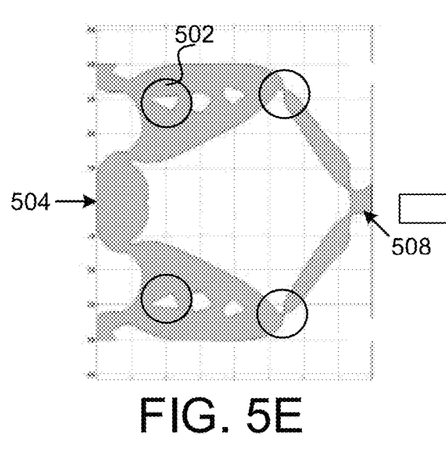
Figure 5F:
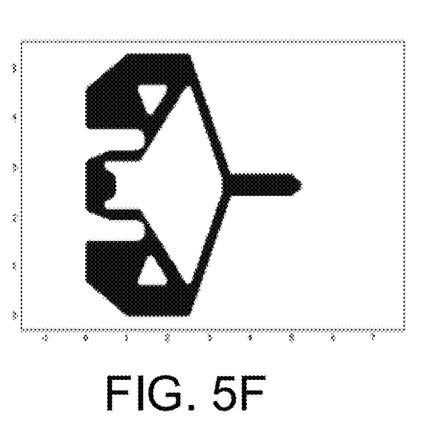

Similarly, FIG. 5E depicts an optimized level-set structural design of a push-button flexure mechanism that is actuated by applying a load 504 or force, e.g., an electrical load at a point on the end of the push-button to actuate the push-button 508. As is evident in FIG. 5C, even though this is the optimal level-set structural design for the push-button, there are obvious manufacturing issues 502 in the design such as holes, weak joints, portions to cut out that are smaller than the available tools, and/or the like. FIG. 5F, on the other hand, depicts the resultant structural design when the constraints described above are accounted for in the level-set formula. The resulting structural design is now manufacturable based on the given constraints, while providing optimal flexibility and volume.

Figure 6:
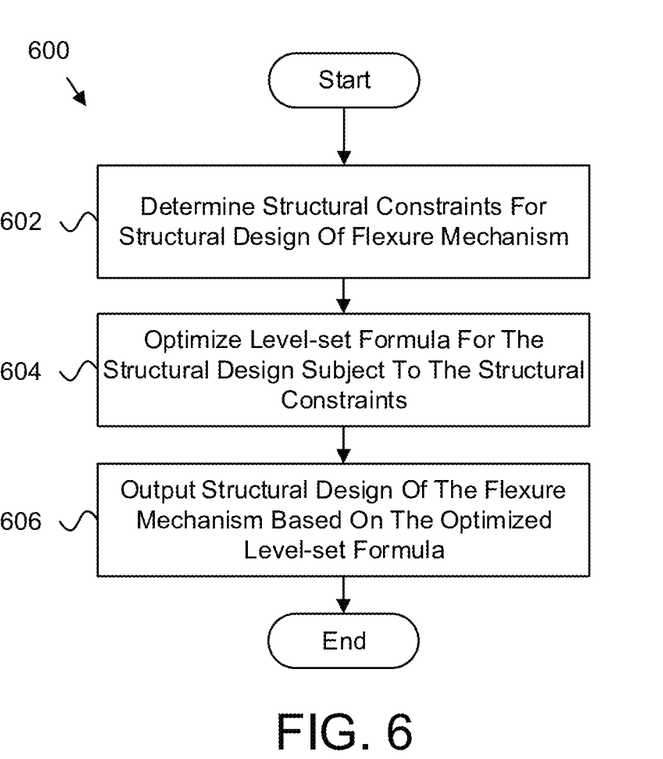
FIG. 6 is a schematic flow diagram of a method for optimizing the level-set structural design of a flexure mechanism, according to one or more examples of the present disclosure.

FIG. 6 is a schematic flow-chart diagram illustrating one embodiment of a method 600 for optimizing level-set structural design of flexure mechanism. The method 600 begins, and determines 602 one or more structural constraints for a structural design of a flexure mechanism. In one embodiment, the method 600 optimizes 604 a level-set formula describing the structural design of the flexure mechanism subject to the one or more structural constraints for manufacturing the structural design of the flexure mechanism. In further embodiments, the method 600 outputs 606 the structural design of the flexure mechanism based on the optimized level-set formula for manufacturing, and the method 600 ends. In one embodiment, the constraint module 202, the optimization module 204, and/or the design module 206 performs the various steps of the method 600.

Figure 7:
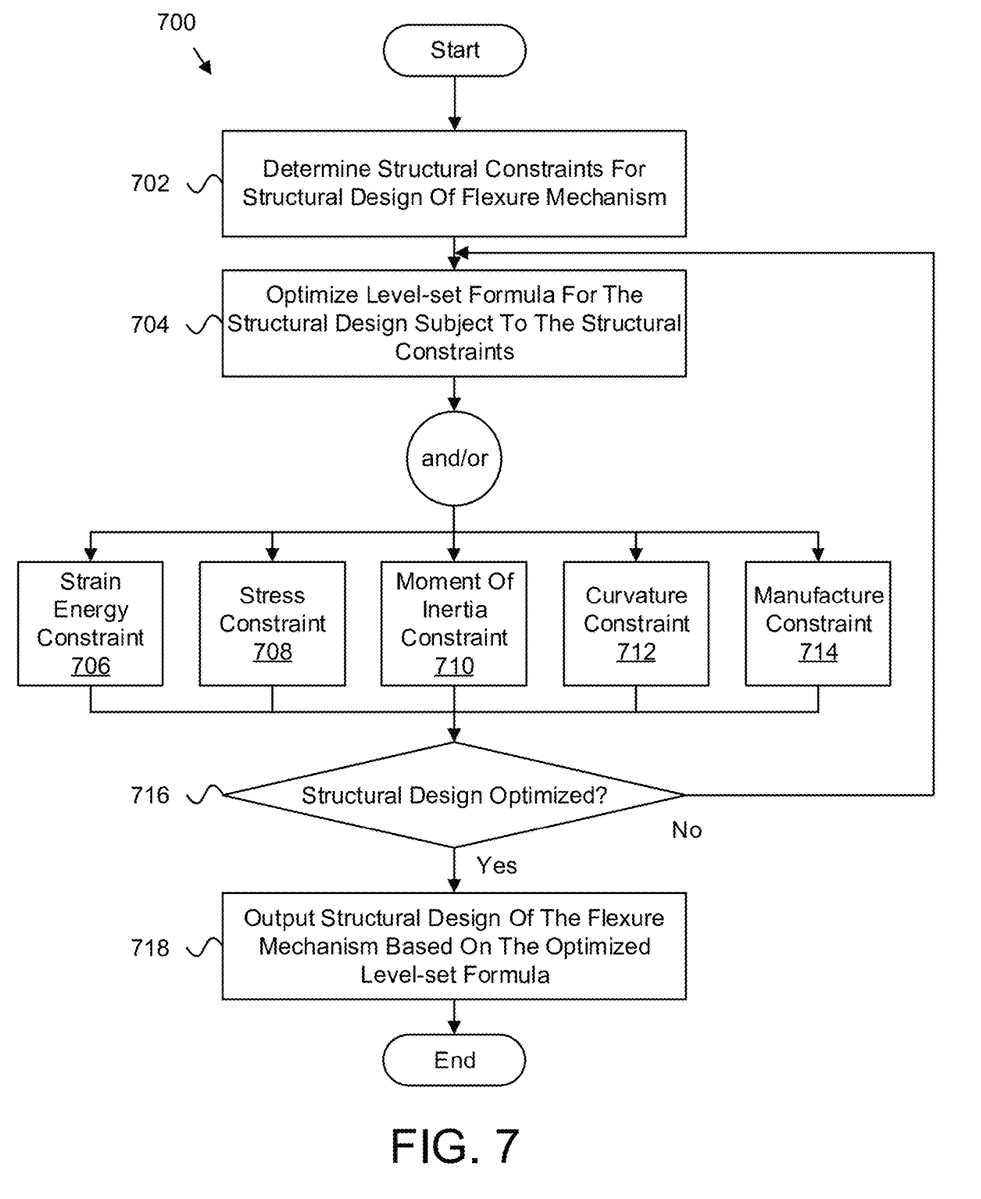
FIG. 7 is a schematic flow diagram of a method for optimizing the level-set structural design of a flexure mechanism, according to one or more examples of the present disclosure.

FIG. 7 is a schematic flow-chart diagram illustrating one embodiment of a method 700 for optimizing level-set structural design of flexure mechanism. The method 700 begins and determines 702 one or more structural constraints for a structural design of a flexure mechanism. The method 700, in certain embodiments, optimizes 704 a level-set formula describing the structural design of the flexure mechanism subject to the one or more structural constraints for manufacturing the structural design of the flexure mechanism. For instance, the method 700 may modify the optimized level-set formula for the structural design of the flexure mechanism by applying one or more of a strain energy constraint 706, a stress constraint 708, a moment of inertial constraint 710, a curvature constraint 712, and/or a manufacturability constraint 714.

The method 700, in various embodiments, determines 716 whether the modified level-set formula is optimal given the applied constraints. If not, the method 700 continues to optimize the level-set formula for the structural design of the flexure mechanism. Otherwise, the method 700, in one embodiment, outputs 718 the structural design of the flexure mechanism based on the optimized level-set formula for manufacturing, and the method 700 ends. In one embodiment, the constraint module 202, the optimization module 204, and/or the design module 206 performs the various steps of the method 700.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method, comprising:
   determining one or more structural constraints for a structural design of a flexure mechanism, the flexure mechanism comprising a plurality of rigid structural elements that are connected by a plurality of flexible structural elements, the plurality of rigid and flexible structural elements producing a geometric motion on application of a force;
   optimizing a level-set formula describing the structural design of the flexure mechanism subject to the one or more structural constraints for manufacturing the structural design of the flexure mechanism, the structural design of the flexure mechanism being free of joints and comprising one or more load points that are acted upon using an electrical load to actuate at least a portion of the plurality of flexible structural elements to produce the geometric motion of the flexure mechanism; and
   outputting the structural design of the flexure mechanism based on the optimized level-set formula to a manufacturing device manufacturing the flexure mechanism according to the structural design.

2. The method according to claim 1, wherein the one or more structural constraints comprises a strain energy constraint and a volume constraint, the strain energy constraint and the volume constraint being minimized.

3. The method according to claim 2, wherein the strain energy constraint and the volume constraint are minimized simultaneously during optimization of the level-set formula such that the structural design has minimum volume and maximum stiffness.

4. The method according to claim 2, wherein the one or more structural constraints further comprises a stress constraint, the stress constraint being maintained below a critical stress threshold while minimizing the strain energy constraint and the volume constraint.

5. The method according to claim 2, wherein the one or more structural constraints further comprises a moment of inertia constraint, the moment of inertia constraint being maintained below a moment of inertia threshold while minimizing the strain energy constraint and the volume constraint.

6. The method according to claim 2, wherein the one or more structural constraints further comprises a curvature constraint, the curvature constraint comprising a convex curvature that is maintained below a curvature threshold while minimizing the strain energy constraint and the volume constraint.

7. The method according to claim 6, wherein a boundary of the curvature constraint is defined as a function of a radius of a tool used to manufacture the structural design.

8. The method according to claim 7, wherein the one or more structural constraints further comprises a manufacturability constraint, the manufacturability constraint defined as a function of a diameter of the tool used to manufacture the structural design such that the diameter is less than a width of an opening of the structural design that the tool passes through to access a portion of the structural design while minimizing the strain energy constraint and the volume constraint.

9. An apparatus, comprising:
   a processor;
   a memory that stores code executable by the processor to:
      determine one or more structural constraints for a structural design of a flexure mechanism, the flexure mechanism comprising a plurality of rigid structural elements that are connected by a plurality of flexible structural elements, the plurality of rigid and flexible structural elements producing a geometric motion on application of a force;
      optimize a level-set formula describing the structural design of the flexure mechanism subject to the one or more structural constraints for manufacturing the structural design of the flexure mechanism, the structural design of the flexure mechanism being free of joints and comprising one or more load points that are acted upon using an electrical load to actuate at least a portion of the plurality of flexible structural elements to produce the geometric motion of the flexure mechanism; and
      output the structural design of the flexure mechanism based on the optimized level-set formula to a manufacturing device manufacturing the flexure mechanism according to the structural design.

10. The apparatus according to claim 9, wherein the one or more structural constraints comprises a strain energy constraint and a volume constraint, the strain energy constraint and the volume constraint being minimized.

11. The apparatus according to claim 10, wherein the strain energy constraint and the volume constraint are minimized simultaneously during optimization of the level-set formula such that the structure design has minimum volume and maximum stiffness.

12. The apparatus according to claim 10, wherein the one or more structural constraints further comprises a stress constraint, the stress constraint being maintained below a critical stress threshold while minimizing the strain energy constraint and the volume constraint.

13. The apparatus according to claim 10, wherein the one or more structural constraints further comprises a moment of inertia constraint, the moment of inertia constraint being maintained below a moment of inertia threshold while minimizing the strain energy constraint and the volume constraint.

14. The apparatus according to claim 10, wherein the one or more structural constraints further comprises a curvature constraint, the curvature constraint comprising a convex curvature that is maintained below a curvature threshold while minimizing the strain energy constraint and the volume constraint.

15. The apparatus according to claim 14, wherein a boundary of the curvature constraint is defined as a function of a radius of a tool used to manufacture the structural design.

16. The apparatus according to claim 15, wherein the one or more structural constraints further comprises a manufacturability constraint, the manufacturability constraint defined as a function of a diameter of the tool used to manufacture the structural design such that the diameter is less than a width of an opening of the structural design that the tool passes through to access a portion of the structural design while minimizing the strain energy constraint and the volume constraint.

17. A program product comprising a non-transitory computer readable storage medium that stores code executable by a processor, the executable code comprising code to:
   determine one or more structural constraints for a structural design of a flexure mechanism, the flexure mechanism comprising a plurality of rigid structural elements that are connected by a plurality of flexible structural elements, the plurality of rigid and flexible structural elements producing a geometric motion on application of a force;

optimize a level-set formula describing the structural design of the flexure mechanism subject to the one or more structural constraints for manufacturing the structural design of the flexure mechanism, the structural design of the flexure mechanism being free of joints and comprising one or more load points that are acted upon using an electrical load to actuate at least a portion of the plurality of flexible structural elements to produce the geometric motion of the flexure mechanism; and output the structural design of the flexure mechanism based on the optimized level-set formula to a manufacturing device manufacturing the flexure mechanism according to the structural design.

18. The method of claim 1, further comprising recommending at least one constraint to be used for optimizing the level-set formula based on results from a plurality of previously-executed level-set optimization iterations for the structural design wherein various combinations of structural constraints and parameters for the structural constraints are modified for the previously-executed level-set optimization iterations.

19. The method of claim 1, wherein the flexure mechanism comprises a gripper flexure mechanism comprising a plurality of structural elements for gripping that are actuated in response to application of an electrical load.

20. The method of claim 1, wherein the flexure mechanism comprises a push button flexure mechanism comprising a push button structural element that is actuated in response to application of an electrical load to the push button structural element.

* * * * *